United States Patent
Spraul

(10) Patent No.: US 8,448,042 B2
(45) Date of Patent: May 21, 2013

(54) DATA PROCESSING DEVICE AND A METHOD FOR ERROR DETECTION AND ERROR CORRECTION

(75) Inventor: Manfred Spraul, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 12/771,488

(22) Filed: Apr. 30, 2010

(65) Prior Publication Data

US 2010/0306620 A1    Dec. 2, 2010

(30) Foreign Application Priority Data

May 27, 2009 (EP) ..................................... 09161244

(51) Int. Cl.
*G11C 29/00* (2006.01)

(52) U.S. Cl.
USPC ............. 714/763; 714/6.1; 714/6.11; 714/25; 714/48

(58) Field of Classification Search
USPC ................................ 714/763, 6.1, 6.11, 25, 48
See application file for complete search history.

(56) References Cited

U.S. PATENT DOCUMENTS

| | | | |
|---|---|---|---|
| 4,661,955 A | 4/1987 | Arlington et al. | |
| 5,172,339 A * | 12/1992 | Noguchi et al. | 365/201 |
| 5,490,155 A * | 2/1996 | Abdoo et al. | 714/763 |
| 6,282,622 B1 * | 8/2001 | Morris | 711/170 |
| 6,604,222 B1 * | 8/2003 | Jensen | 714/785 |
| 6,938,193 B1 * | 8/2005 | Honda | 714/720 |
| 7,246,269 B1 | 7/2007 | Hamilton | |
| 7,987,398 B2 * | 7/2011 | Kitaoka et al. | 714/725 |
| 8,055,988 B2 * | 11/2011 | Lam | 714/803 |
| 2005/0060603 A1 | 3/2005 | Pomaranski et al. | |
| 2005/0066253 A1 * | 3/2005 | Aipperspach et al. | 714/763 |
| 2008/0244370 A1 * | 10/2008 | Lam | 714/803 |

* cited by examiner

*Primary Examiner* — Charles Ehne
(74) *Attorney, Agent, or Firm* — Kenyon & Kenyon LLP

(57) ABSTRACT

A data processing device and a method for error detection and error correction. The data processing device includes an error detection arrangement and an error correction arrangement. The error detection arrangement is able to detect correctable error and uncorrectable error in the data stored in a memory cell of the memory. The error detection arrangement then determines the neighboring memory cells or memory cells that are physically adjacent to the memory cell for which the correctable error was detected and generates a signal indicating a fault depending on the correctable errors detected in the neighboring physically adjacent memory cells. If a signal indicating a fault is not generated, then an error correction arrangement is used to correct the correctable error detected by the error detection arrangement.

12 Claims, 2 Drawing Sheets

DATA PROCESSING DEVICE AND A METHOD FOR ERROR DETECTION AND ERROR CORRECTION

RELATED APPLICATION INFORMATION

The present application claims priority to and the benefit of European patent application no. EP0916244, which was filed in the European Patent Office in Germany on May 27, 2009, the disclosure of which is incorporated herein by reference.

FIELD OF THE INVENTION

This invention relates to a data processing device and a method of error detection and error correction.

BACKGROUND INFORMATION

U.S. Pat. No. 4,661,955 discusses a digital error detection and correction apparatus wherein error correction codes are used for error detection and correction. The apparatus detects correctable errors and is adapted to correct a predetermined number of correctable errors. If more than the predetermined number of correctable errors are detected then the error detection and correction apparatus provides an uncorrectable error output signal.

SUMMARY OF THE INVENTION

The data processing device and the method of error detection and error correction according to the description herein have the following advantages.

The processing device and the method of error detection and error correction detects correctable error and uncorrectable error for data stored in a memory cell of the memory and further detects at least correctable errors in neighboring memory cells which are physically adjacent to the memory cell for which a correctable error was detected. This increases the ability of the system to deal with errors or degradation based on radiation which affect physical areas or memory blocks of a memory which are not logically addressed one after the other. So this device and method is suitable to detect errors affecting the memory due to errors based on radiation. Since the structures of semiconductor memories are getting smaller, the effect of radiation induced errors has increased. The data processing device and the method solves the increasing problem of radiation based errors due to shrinking dimensions of the memory.

Further improvements and/or advantages are realized by the features of further described herein.

By maintaining a log of the correctable errors detected in the neighboring memory cells by the error detection arrangement, a user can define the fault tolerance of the system using the data processing device. The fault tolerance can be defined for different fault conditions occurring in the system. This allows the user to decide the efficiency with which the system should operate under different fault conditions. This allows the user to alter the overall workability of the system. Thus the system can be operated at varying efficiency depending on the operations performed by the system.

By generating fault signals depending on the number of correctable errors detected in the neighboring memory cells in the memory, allows the user to define fault tolerance in the system using the data processing device. Thus a system can be made high fault tolerant or low fault tolerant depending on the number of correctable errors detected while particular operations are performed in the system. This increases the ability of the system to adapt to different fault scenarios.

By reducing the functionality of the system or by stopping further processing in the system, a user can define the sensitivity of the system to the correctable error or uncorrectable error detected in the neighboring memory cells of the memory by the error detection device. Thus a system can be made high fault sensitive or low fault sensitive depending on the number of correctable errors or the type of error detected by the error detection arrangement. This allows the user to alter the workability of the system when different faults occur in the system. This, in turn, increases overall efficiency of the system while performing different operations.

Different modes of the exemplary embodiments and/or exemplary methods of the present invention are disclosed in detail in the description and illustrated in the accompanying drawings.

DETAILED DESCRIPTION

Figure 1:
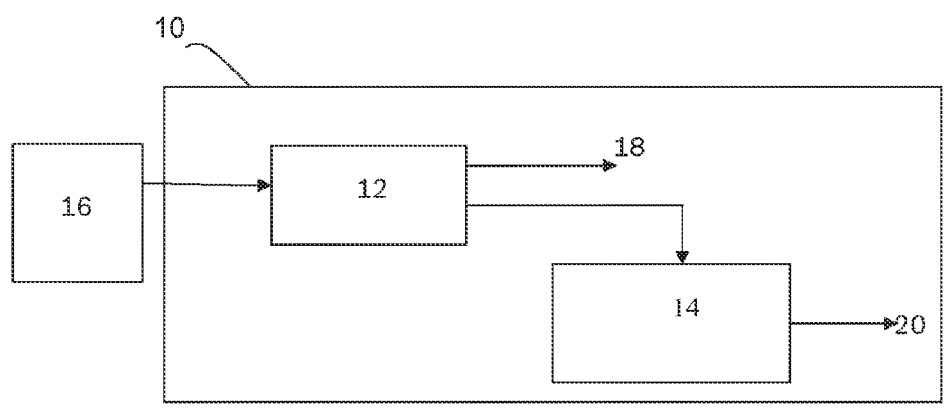
FIG. 1 illustrates a data processing device comprising various components and the connection between the components.

FIG. 1 illustrates a data processing device comprising various components and the connection between the components. The data processing device (10) comprises an error detection arrangement (12) and an error correction arrangement (14). The error detection arrangement (12) receives input signals from a memory (16) which is external to the data processing device (10). The error detection arrangement generates two output signals. One output signal (18) and another output signal which is given as input to the error correction arrangement (14). The error correction arrangement (14) generates an output signal (20).

The data processing device (10) may be a hardware device such as an independent processor or may be a co-processor of a multi processor device used in electronic control units or computer systems. The error detection arrangement (12) may be a hardware device such as an independent processor or a co-processor or may be implemented by arrangement of a computer program which is executed in the data processing device (10). The error correction arrangement (14) may be a hardware device such as an independent processor or a co-processor or maybe implemented by arrangement of a computer program which is executed in the data processing device (10). The memory (16) is a solid state memory device such as a flash memory, RAM, ROM, EProm and the like. The components (10), (12), (14) and (16) could be separate parts of a computer or could be areas on the same chip if the system is implemented as a System-on-a-Chip (SOC) device.

The data processing device (10) has a wide variety of applications and may be used in computer systems or in electronic control units for performing computing operations, diagnostic operation and the like. When data is being communicated between devices or when information is stored in memory (16), different types of errors may affect the information being communicated or stored. The use of a data processing device (10) which can execute error detection and error correction functions is required so that a system can be informed of the existence of an error and if possible correct the errors occurring in the system. There may be several sources for the occurrence of the errors, such as exposure to energetic ions or protons, radiation, white noise, thermal noise, errors due to electrical disturbances, short circuiting and the like. When an error is introduced in a system, the data bits which are communicated or stored in the memory (16) change. Different sources of error and noise signals may introduce errors in a single bit or multiple bits of data depending upon the characteristics of the error source or noise signal. The errors may be randomly occurring errors or may follow a particular pattern. Such errors lead to erroneous information being communicated or stored in the memory which leads to errors being carried forward for further processing resulting in multiplication of faults and eventually results in breakdown of the system.

The data processing device (10) usually employs different types of algorithms which facilitate detection and correction of errors. Depending on the number of bits in which the error occurs, different error detection and error correction algorithms may be used. The algorithm used also depends on the requirement of the system and the type of errors that affect the system. Some of the commonly used algorithms are as follows: Single Error Correct (SEC), Single Error Correct-Double Error Detect (SEC-DED), Double Error Correct-Triple Error Detect (DED-TED), Single Error Correct-Quadruple Error Detect and the like. The SEC-DED algorithm is more popular than the other algorithms as the processing time needed to execute the algorithm and the memory overheads are lower.

Figure 2:
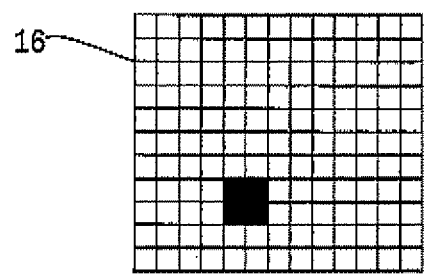
FIG. 2 illustrates a memory used in a system using a processing device and representing physically adjacent memory cells in the memory.

FIG. 2 illustrates a memory used in a system using a processing device (10) which represents physically adjacent memory cells in the memory (16). Organization of the memory (16) can be explained in simple terms in the form of a two dimensional matrix of rows and columns as shown in the figure. Each block of the matrix represents a memory cell. When the memory is assembled and ready to use, each block or memory cell is provided with a unique address which identifies that memory cell in the memory (16). Different devices make use of this unique address to read, write, store and retrieve information from memory cells. The memory cells are addressed logically one after the other, for example, a device using a memory addressed in HEX has memory address such as A678, A679, A67A, A67B so on and so forth. A device can call on these memory cells using the memory address and interact with the memory cells. A group of memory cells which are logically addressed one after the other may be termed as logical adjacent memory cells in a memory. However, when the memory is being assembled or manufactured, oftentimes memory cells that are in physical proximity of each other are not necessarily logically adjacent to each other. For example, if we take a block of four memory cells that are in physical proximity of each other in the memory (16) represented by the dark area in FIG. 2, it is observed that the logical addresses of the memory cells are the following: A67A, B09D, 1234 and 980B.

Figure 3:
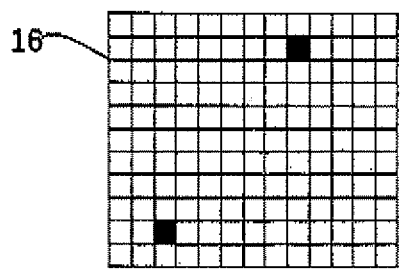
FIG. 3 illustrates a memory used in a system using a processing device and representing logically adjacent memory cells in the memory.

These memory cells which are in physical proximity are also called as physically Adjacent memory cells. Physically adjacent memory cells mean the memory cells which are in physical proximity of each other in a particular physical area of the memory (16), for example, a group of memory cells which are at a distance of a few micrometers from each other are considered to be physically adjacent. From the explanation provided, one can observe that memory cells that are logically adjacent need not necessarily be physically adjacent. Thus logically adjacent memory cells may be located at two different physical areas in the memory (16) and not necessarily in physical proximity as shown in FIG. 3.

Radiations cause errors in data stored in the memory cells of a memory, which are in physical proximity of each other, i.e., radiation causes errors in physically adjacent memory cells. Hence, it is necessary that the data processing device (10) and the error detection and correction method be able to check correctable errors or uncorrectable errors affecting physically adjacent memory cells.

The data processing device and the method of error detection and error correction is explained as follows. The error detection arrangement (12) receives the data stored in a memory cell of the memory (16). The error detection arrangement (12) detects correctable error and uncorrectable error in the received data stored in the memory cell. If an uncorrectable error is detected by the error detection arrangement (12), it generates a signal (18) indicating a fault that the error is an uncorrectable error. The signal (18) indicating an uncorrectable error triggers an interrupt routine which typically stops further processing in a system using the data processing device (10). Other possible options that may be used would be a full system reset or an extended self test routine. This avoids the errors being carried forward and multiplication of the faults does not take place. When a correctable error is detected the error detection arrangement (12) determines the neighboring memory cells for which the correctable error was detected by the error detection arrangement (12). Neighboring memory cells refer to physically adjacent memory cells. After determining the neighboring memory cells the error detection arrangement (12) detects at least correctable errors in the data stored in the neighboring memory cells in the memory (16). When the error detection arrangement (12) detects a correctable error it starts logging in the number of correctable errors that are detected in the neighboring memory cells. The error detection arrangement (12) generates a signal (18) indicating a fault if at least one correctable error is detected in the neighboring memory cells. The signal (18) indicating the fault can reduce the functionality of the system using the data processing device (10) if at least one correctable error is detected in the neighboring memory cells. The signal (18) indicating the fault can also stop further processing of the system using the data processing device (10) if at least one or more than one correctable error is detected by the error detection arrangement (12) in the neighboring memory cells. If an uncorrectable error is detected in the neighboring memory cells by the error detection arrangement (12), the signal (18) indicating the fault stops further processing in the system using the data processing device (10).

The data processing device (10) may also be adapted such that it would send a signal to an external supervisor module such as a watchdog. The reduced functionality and the stop in further processing in the system using the processing device (10) is usually implemented by the signal (18) indicating the fault triggering a interrupt routine in the system. If no correctable errors are detected by the error detection arrangement (12) in the neighboring memory cells, then a second output signal from the error detection arrangement (12) is given as input to the error correction arrangement (14). The error correction arrangement (14) corrects the correctable error detected by the error detection arrangement (12) in the memory cell of the memory (16). After the error is corrected the data can be used for further processing in the system through the signal (20).

When at least one or more than one correctable errors are detected in the neighboring memory cells, the decision whether to reduce functionality or to stop further processing can be user defined. The user can decide based on the number of correctable errors logged by the error detection arrangement (12). This allows the user to define the fault tolerance of the system. The user being able to define the fault tolerance has the advantage that the user can alter the sensitivity of the system to the correctable errors occurring in the system. The sensitivity can be altered based on the type of operations performed by the system. If the operations performed by the system using the data processing device (10) are such that fault sensitivity is high, then the signal (18) instructs the system to stop further processing when one correctable error is detected in the neighboring memory cells. If the operations performed by the system using the data processing device (10) are such that fault sensitivity is low, then the signal (18) instructs the system to stop further processing when more than a certain number of correctable errors is detected in the neighboring memory cells. If the operations performed by the system using the data processing device (10) are such that fault sensitivity is very low, then the signal (18) instructs the system to reduce the functionality of the system instead of stopping further processing. However, if an uncorrectable error is detected in the neighboring memory cells, then the signal (18) instructs the system to stop further processing.

This method of error detection and correction is not limited to a system employing a particular error detection or error correction algorithm and can be implemented in a system using any one of the algorithms mentioned before such as SEC-DED, DED-TED, SEC-QED or other error detection and error correction algorithms. Further modifications such using additional ECC or CRC to each data stored in the memory cell are also envisaged.

What is claimed is:

1. A data processing device, comprising:
an error detection arrangement adapted to:
receive data stored in a memory cell of a memory and detect correctable error and uncorrectable error in that data;
responsive to the detection of correctable error in the memory cell, determine memory cells that physically neighbor the memory cell in the memory, and detect whether there is correctable error in data stored in the determined neighboring memory cells; and
responsive to detection of correctable error in the data stored in the determined neighboring memory cells, generate a fault signal; and
an error correction arrangement adapted to correct a correctable error detected by the error detection arrangement.

2. The device of claim 1, wherein the error detection arrangement is adapted to maintain a log of the correctable errors detected in data stored in the neighboring memory cells.

3. The device of claim 1, wherein the error detection arrangement generates the fault signal if the number of correctable errors detected in the neighboring memory cells is at least one.

4. The device of claim 1, wherein the error detection arrangement generates the fault signal if an uncorrectable error is detected in the neighboring memory cells.

5. The device of claim 1, wherein the fault signal generated by the error detection arrangement reduces a functionality of the data processing device if at least one correctable error is detected in the neighboring memory cells.

6. The device of claim 1, wherein the fault signal generated by the error detection arrangement stops further processing in a system using a data processing device if at least one correctable error is detected in the neighboring memory cells.

7. The device of claim 1, wherein the fault signal generated by the error detection arrangement stops further processing in a system using the data processing device if an uncorrectable error is detected in the neighboring memory cells.

8. The device of claim 1, where the fault signal generated by the error detection arrangement triggers an interrupt which reduces a functionality of a system using the data processing device if at least one correctable error is detected in the neighboring memory cells.

9. The device of claim 1, wherein the fault signal generated by the error detection arrangement triggers an interrupt which stops further processing in a system using the data processing device if an uncorrectable error is detected in the neighboring memory cells.

10. The device of claim 1, wherein memory cells are determined to physically neighbor the memory cell conditional upon being located within a predetermined physical distance from the memory cell.

11. A method of providing error detection and error correction, the method comprising:
receiving data stored in a memory cell of a memory;
detecting a correctable error and an uncorrectable error;
responsive to the detection of a correctable error in the memory cell:
determining memory cells that physically neighbor the memory cell for which a correctable error was detected; and
detecting whether there is correctable error in data stored in the
determined neighboring memory cells of the memory;
responsive to the detection of correctable error in the data stored in the determined neighboring memory cells, generating a fault signal, wherein correction of correctable error is conditional upon that the fault signal is not generated.

12. The method of claim 11, wherein memory cells are determined to physically neighbor the memory cell conditional upon being located within a predetermined physical distance from the memory cell.

* * * * *